United States Patent
Parnell

(10) Patent No.: US 9,916,779 B1
(45) Date of Patent: Mar. 13, 2018

(54) MULTI-POSITION ILLUMINATED SIGNAGE PANEL

(71) Applicant: Sherry Parnell, Brandywine, MD (US)

(72) Inventor: Sherry Parnell, Brandywine, MD (US)

( * ) Notice: Subject to any disclaimer, the term of this patent is extended or adjusted under 35 U.S.C. 154(b) by 0 days.

(21) Appl. No.: 15/697,960

(22) Filed: Sep. 7, 2017

(51) Int. Cl.
  G09F 21/00 (2006.01)
  G09F 13/04 (2006.01)
  G09F 21/04 (2006.01)
  H02S 20/00 (2014.01)

(52) U.S. Cl.
  CPC ........ *G09F 13/0413* (2013.01); *G09F 21/048* (2013.01); *H02S 20/00* (2013.01); *G09F 2013/044* (2013.01); *G09F 2013/0445* (2013.01)

(58) Field of Classification Search
  CPC .. G09F 21/048; G09F 21/04; G09F 2021/041; G09F 21/00; G09F 2013/044; G09F 2013/0445; G06Q 30/0265; G06Q 30/0266
  See application file for complete search history.

(56) References Cited

U.S. PATENT DOCUMENTS

| | | | |
|---|---|---|---|
| 2,803,810 A * | 8/1957 | Evans et al. | G08B 5/002 116/33 |
| 5,027,537 A | 7/1991 | Freeman | |
| 6,796,060 B1 | 9/2004 | Meester | |
| 8,544,198 B2 | 10/2013 | Iverson | |
| 9,015,972 B1 | 4/2015 | Morgan | |
| 9,141,973 B2 | 9/2015 | Mendoza | |
| 9,483,777 B2 | 11/2016 | Sarangi | |
| 2003/0205101 A1 * | 11/2003 | Harmon | B60R 13/10 74/501.6 |
| 2007/0258262 A1 | 11/2007 | Hanyon | |
| 2014/0026451 A1 * | 1/2014 | Gillespie | G09F 13/04 40/578 |
| 2014/0114764 A1 * | 4/2014 | Mendoza | G09F 21/048 705/14.62 |
| 2015/0054660 A1 * | 2/2015 | Simmons | B60Q 1/46 340/908 |
| 2016/0207478 A1 | 7/2016 | Georgiadis | |
| 2018/0001836 A1 * | 1/2018 | Pan | B60R 11/04 |

FOREIGN PATENT DOCUMENTS

WO    WO2011013113    2/2011

* cited by examiner

*Primary Examiner* — Cassandra H Davis
(74) *Attorney, Agent, or Firm* — Goldstein Law Offices, P.C.

(57) ABSTRACT

A multi-position illuminated signage panel comprising a mounting assembly anchored to a vehicle, a display assembly, and an intermediate assembly. The display assembly comprises an illumination panel and a sign insert for displaying a visual element. The intermediate assembly comprises a control unit for controlling the operation of the illumination panel, the control unit having a solar panel, rechargeable battery, motion sensor, light sensor, and control module. The illumination panel is positioned behind the sign insert and produces a back-light effect by emitting light which passes through the sign insert. The illumination panel can be activated when the motion sensor detects the vehicle's motion, and deactivated when the photosensor is exposed to light. The display assembly is hingedly connected to the intermediate assembly, which is in turn hingedly connected to the mounting assembly, allowing the multi-position signage panel to be configured in multiple display positions.

15 Claims, 13 Drawing Sheets

MULTI-POSITION ILLUMINATED SIGNAGE PANEL

TECHNICAL FIELD

The present disclosure relates generally to a vehicle mounted signage panel. More particularly, the present disclosure relates to a vehicle mounted apparatus for displaying an illuminated signage panel which is solar powered and capable of being placed in more than one display position.

BACKGROUND

Many vehicle owners enjoy personalizing their vehicles with visual modifications such as bumper stickers, magnets, and window stickers. These are commonly used to display slogans and logos, indicate support for sports teams, political parties and candidates, or otherwise convey a message or statement. Some vehicle owners may install vanity license plates, custom license plate frames, or attention-grabbing lights. Other vehicle owners may wish to use space on their vehicles to display advertisements, such as by attaching small billboards.

However, many of these modifications often have significant drawbacks. Bumper stickers may appear simple to apply, but are often difficult to align properly, giving many bumper stickers the appearance of having been haphazardly attached. Furthermore, because bumper stickers are often virtually impossible to remove without damaging a vehicle's finish, vehicle owners often decide against removing unwanted bumper stickers such as outdated political stickers, or may simply refuse to use bumper stickers. Magnets are an alternative to permanent bumper stickers, but magnets often leave fade marks when removed. Window stickers may be relatively easy to apply and remove, but they may block a driver's view. Car mounted billboards are often difficult to apply, requiring a roof rack, magnets, suction cups, or other imperfect or cumbersome mounting solutions, and are often too visually obtrusive for use on non-commercial vehicles.

Certain vehicle mounted signage devices within the prior art seek to provide alternatives to bumper stickers and other more cumbersome modifications. While these devices may be suitable for the particular purpose employed, or for general use, they would not be as suitable for the purposes of the present disclosure as disclosed hereafter. These devices generally provide a fixed mounting position for displaying signage. Other devices provide lights or other means for enhancing the visibility of or which draw attention to signs, but these generally require a connection to the vehicle's electrical system in order to operate. Therefore, there is a need for a vehicle signage device which combines the simplicity of a sticker and the interchangeability of a magnet, with the attention-grabbing effect of an illuminated sign, while also providing flexibility which allows the device to adapt to different vehicle types and use scenarios.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a signage panel for mounting on a vehicle, which is illuminated and capable of being configured in multiple display positions. Accordingly, the present disclosure provides a multi-position illuminated signage panel comprising a mounting assembly configured to be anchored to a vehicle, a display assembly having an illumination panel and a sign insert for displaying a visual element, and an intermediate assembly which connects the display assembly to the mounting assembly. The sign insert can be used to display logos, slogans, advertisements, and can also act as a surface for attaching adhesive stickers. This allows visual elements such as bumper stickers to be displayed on the sign insert without causing damage to the vehicle.

In an aspect of an example embodiment in the present disclosure, the mounting assembly comprises a license plate frame configured to hold a vehicle license plate, a right mounting bracket, and a left mounting bracket. Accordingly, the right and left mounting brackets are attached to a vehicle mounting surface disposed on the vehicle, and the license plate frame is attached to the right and left mounting brackets.

In another aspect of an example embodiment in the present disclosure, the display assembly further comprises a display frame having a display window, and a backing plate. Accordingly, the display frame is secured to the backing plate such that the sign insert and the illumination panel are retained between the display frame and backing plate, while the display window allows the sign insert to be viewed through the display frame.

In a further aspect of an example embodiment in the present disclosure, the display assembly is configured to allow the sign insert to be removed and replaced with a different sign insert. Accordingly, the display frame can be detached from the backing plate, allowing the sign insert to be removed and be replaced.

In yet another aspect of an example embodiment in the present disclosure, the illumination panel comprises an illumination element, where the illumination panel is disposed on the backing plate. Accordingly, light produced by the illumination panel passes through the sign insert, resulting in a back-lighting effect. Furthermore, the sign insert can be partially or entirely translucent to enhance the back-lighting effect.

In yet a further aspect of an example embodiment in the present disclosure, the intermediate assembly comprises a control unit having a control module, a rechargeable battery, a solar panel configured to charge the battery, a photosensor configured to detect the presence of light, and a motion sensor configured to detect the motion of the vehicle. Accordingly, the control module is configured to activate the illumination panel when the vehicle is in motion, and deactivate the illumination panel when the photosensor detects the presence of light exceeding a lighting threshold. By combining solar power with the ability to automatically activate and deactivate the illumination panel based motion and light conditions, the multi-position illuminated signage panel is capable of sustained independent operation without any intervention by the operator of the vehicle.

It is another aspect of an example embodiment in the present disclosure to provide a pair of upper hinges and a pair of lower hinges which allow the intermediate assembly and display assembly to be adjusted. Accordingly, the intermediate assembly is connected to the mounting assembly via the pair of upper hinges, and the intermediate assembly is connected to the display assembly via the pair of lower hinges.

It is yet another aspect of an example embodiment in the present disclosure for the upper and lower hinges to be capable of a range of motion of 180-degrees. Accordingly, the upper hinges allow the intermediate assembly to be raised to a folded position where the intermediate assembly faces the license plate frame, where the intermediate assembly can then be lowered along a 180-degree range of motion. Furthermore, the lower hinges allow the display assembly to be placed in a folded position where the backing plate of the display assembly is facing the intermediate assembly, where the display assembly can then be rotated away from the intermediate assembly along a 180-degree range of motion.

It is a further aspect of an embodiment of the present disclosure to provide a display assembly having a display frame with a plurality of display windows. Accordingly, the display assembly may further comprise a plurality of sign inserts, which are visible through the plurality of display windows.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
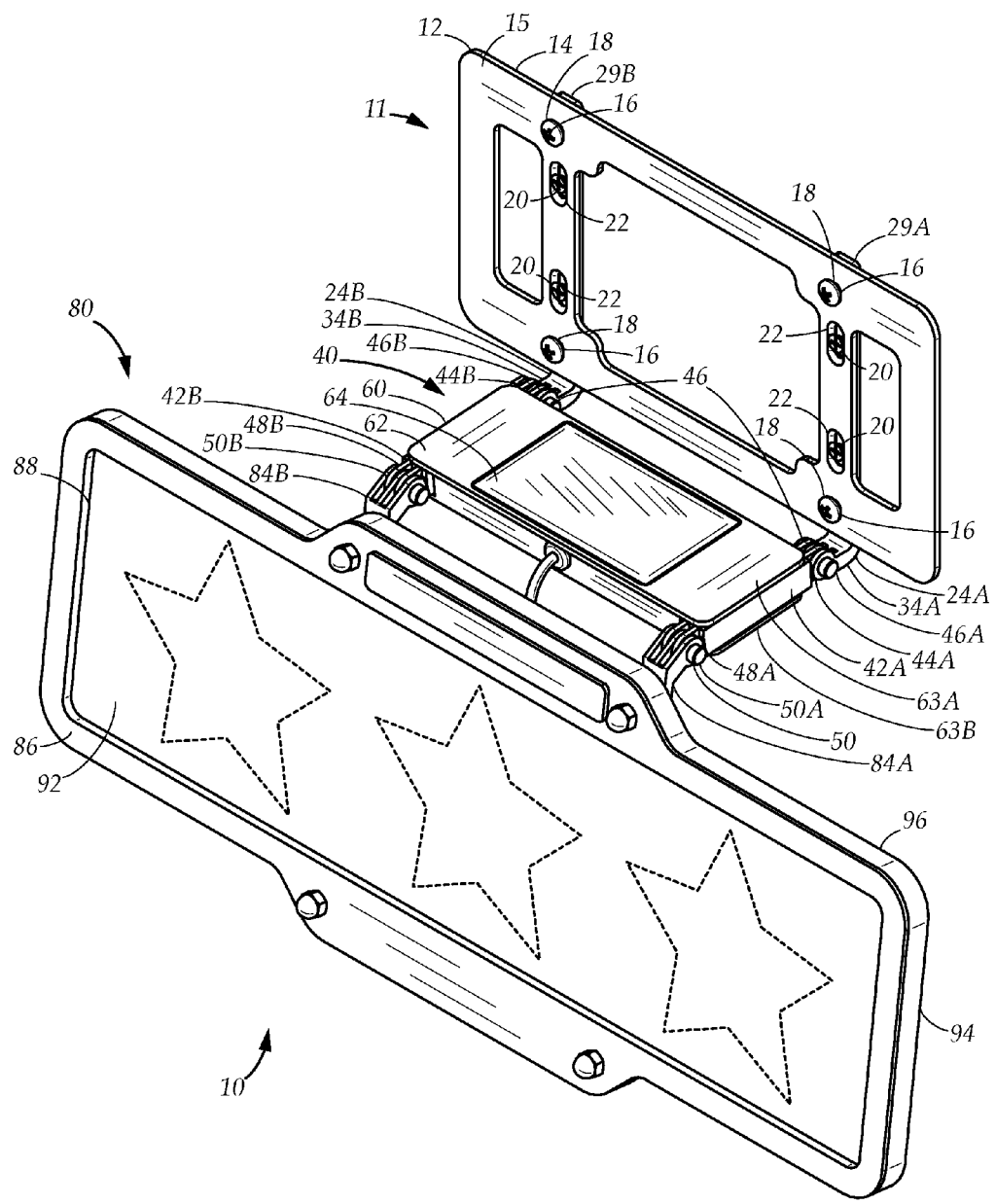
FIG. 1 is diagrammatic perspective view depicting a multi-position illuminated signage panel with a mounting assembly, intermediate assembly, and display assembly, in accordance with an embodiment of the present disclosure.

FIG. 1 illustrates a multi-position illuminated signage panel 10 comprising a mounting assembly 11, an intermediate assembly 40, and a display assembly 80. The display assembly 80 comprises a display frame 86 configured to hold a sign insert 92, which may further include an illumination panel configured to illuminate the sign insert 92. The sign insert 92 comprises a sheet or plate which may be used to display logos, slogans, advertisements, or other visual elements. Bumper stickers and other adhesive stickers may also be attached to the sign insert 92. The display assembly 80 is attached to the intermediate assembly 40 via a pair of lower hinges 50 comprising a right lower hinge 50A and a left lower hinge 50B, and the intermediate assembly 40 is in turn attached to the mounting assembly 11 via a pair of upper hinges 46 comprising a right upper hinge 46A and a left upper hinge 46B. The mounting assembly 11 anchors the multi-position illuminated signage panel to a vehicle mounting surface disposed on a vehicle, such as a car, truck, van, or similar motor vehicle, allowing visual elements to be displayed on the vehicle via the display assembly 80 without causing permanent damage to the vehicle. The multi-position illuminated signage panel 10 can be configured so that the display assembly 80 can be positioned at more than one display position by adjusting the upper and lower hinges 46, 50 of the intermediate assembly 40 to raise or lower the display assembly 80.

The mounting assembly 11 comprises a license plate frame 12 configured to hold a license plate for the vehicle, a right mounting bracket 24A, and a left mounting bracket 24B. As the anchoring structures for the multi-position illuminated signage panel, each of the license plate frame 12 and the right and left mounting brackets 24A, 24B can be made from steel, brass, or aluminum, or other metal or alloy which is lightweight and strong. The license plate frame 12 comprises a license plate frame inner face 14 facing towards the vehicle, and a license plate frame outer face 15 on the opposite side, facing away from the vehicle. The mounting assembly 11 is anchored to the vehicle mounting surface by a plurality of anchoring pins 16 passing through the license plate frame 12 and the right and left mounting brackets 24A, 24B. The license plate frame 12 may further be secured to the right and left mounting brackets 24A, 24B using a plurality of license plate frame retaining pins 20 which pass through a plurality of license plate retaining pin slots 22 formed on the license plate frame 12 to fit within a plurality of mounting bracket retaining holes configured on the right and left mounting brackets 24A, 24B. The right and left mounting brackets 24A, 24B may be configured as vertically oriented brackets. The upper portion of the right mounting bracket 24A comprises a right mounting bracket upper end 29A while the lower portion of the right mounting bracket 24A forms a right mounting bracket connecting arm 34A. Similarly, the upper portion of the left mounting bracket 24B comprises a left mounting bracket end 29B, while the lower portion of the left mounting bracket 24B forms a left mounting bracket connecting arm 34B. Each of the right and left mounting brackets 24A, 24B may be configured so that the right and left connecting arms 34A, 34B are bent at an angle to project outwards and away from the mounting assembly 11. In one embodiment, the right and left connecting arms 34A, 34B are bent outwards at a ninety-degree angle, perpendicular to the license plate frame 12. The right and left connecting arms 34A, 34B are connected to the right and left upper hinges 46A, 46B respectively, thus providing a linkage between the mounting assembly 11 and the intermediate assembly 40.

The intermediate assembly 40 comprises a right intermediate connecting arm 42A and a left intermediate connecting arm 42B. The right and left intermediate connecting arms 42A, 42B are preferably made of a lightweight and strong metal or alloy such as steel, brass, or aluminum. The right intermediate connecting arm 42A comprises a right upper connecting end 44A which is connected to the right upper hinge 46A, and a right lower connecting end 48A. The left intermediate connecting arm 42B comprises a left upper connecting end 44B which is connected to the left upper hinge 46B, and a left lower connecting end 48B. The upper hinges 46 are implemented using hinges that can provide a range of motion of at least 180-degrees between the license plate frame outer face 15 and the intermediate assembly 40, in relation to the plane defined by the license plate frame outer face 15. The right lower connecting end 48A and left lower connecting end 48B are connected to the right lower hinge 50A and left lower hinge 50B respectively. The right and left lower hinges 50A, 50B are in turn connected to the display assembly 80, thus providing a linkage between the intermediate assembly 40 and the display assembly 80. The upper and lower hinges 46, 50 can be further capable of locking in position once adjusted, such as through friction within the hinge, or a locking mechanism.

The intermediate assembly 40 further comprises a control unit 60 disposed between the right and left intermediate connecting arms 42A, 42B. The control unit 60 comprises a control unit housing 62 having a control unit housing upper face 63A, a control unit housing lower face 63B, and a control unit housing frame 63C disposed in between the control unit housing upper face and lower face. The control unit 60 further comprises a solar panel 64 configured on the control unit housing upper face 63A. The control unit housing 62 further contains a rechargeable battery and a control module, and may be equipped with a motion sensor and a photosensor. The control unit 60 further comprises a power connector 74 which connects the control unit to the display assembly 80 and delivers electrical current from the battery to the illumination panel. The control unit housing 62 can be formed from a lightweight but sturdy material such as plastic, sheet metal, or a combination thereof, and is securely attached to the right and left intermediate connecting arms 42A, 42B using welding, adhesives, or fasteners such as screws.

The display assembly 80 comprises, in addition to the display frame 86, a backing plate 94 having a backing plate rear face 96, and may further comprise a right display connecting arm 84A and a left display connecting arm 84B attached to the backing plate rear face 96. The display frame 86 and backing plate can be made from plastic or lightweight metal, similar to the control unit housing 62. The right and left display connection arms 84A, 84B are preferably made of a lightweight and strong metal or alloy such as steel, brass, or aluminum. The right display connecting arm 84A may be connected to the right lower hinge 50A, while the left display connecting arm 84B may be connected to the left lower hinge 50B. The lower hinges 50 allow the display assembly 80 to be raised and lowered, with a range of motion of at least 180-degrees between the backing plate rear face 96 and the control unit housing lower face 63B, in relation to the plane defined by the control unit housing lower face 63B. The right and left display connecting arms 84A, 84B may also be implemented in an angled configuration where the right and left display connecting arms 84A, 84B bend away from the backing plate rear face 96. In one embodiment, the right and left display arms 84A, 84B are bent at an angle of approximately 45-degrees relative to the plane defined by the backing plate rear face 96. The display frame 86 is attached to the backing plate 94, with the sign insert 92 retained in between the display frame 86 and the backing plate 94. The display frame is configured with a display window 88 formed as an opening in the display frame 86 through which the sign insert 92 is exposed to view.

Figure 2:
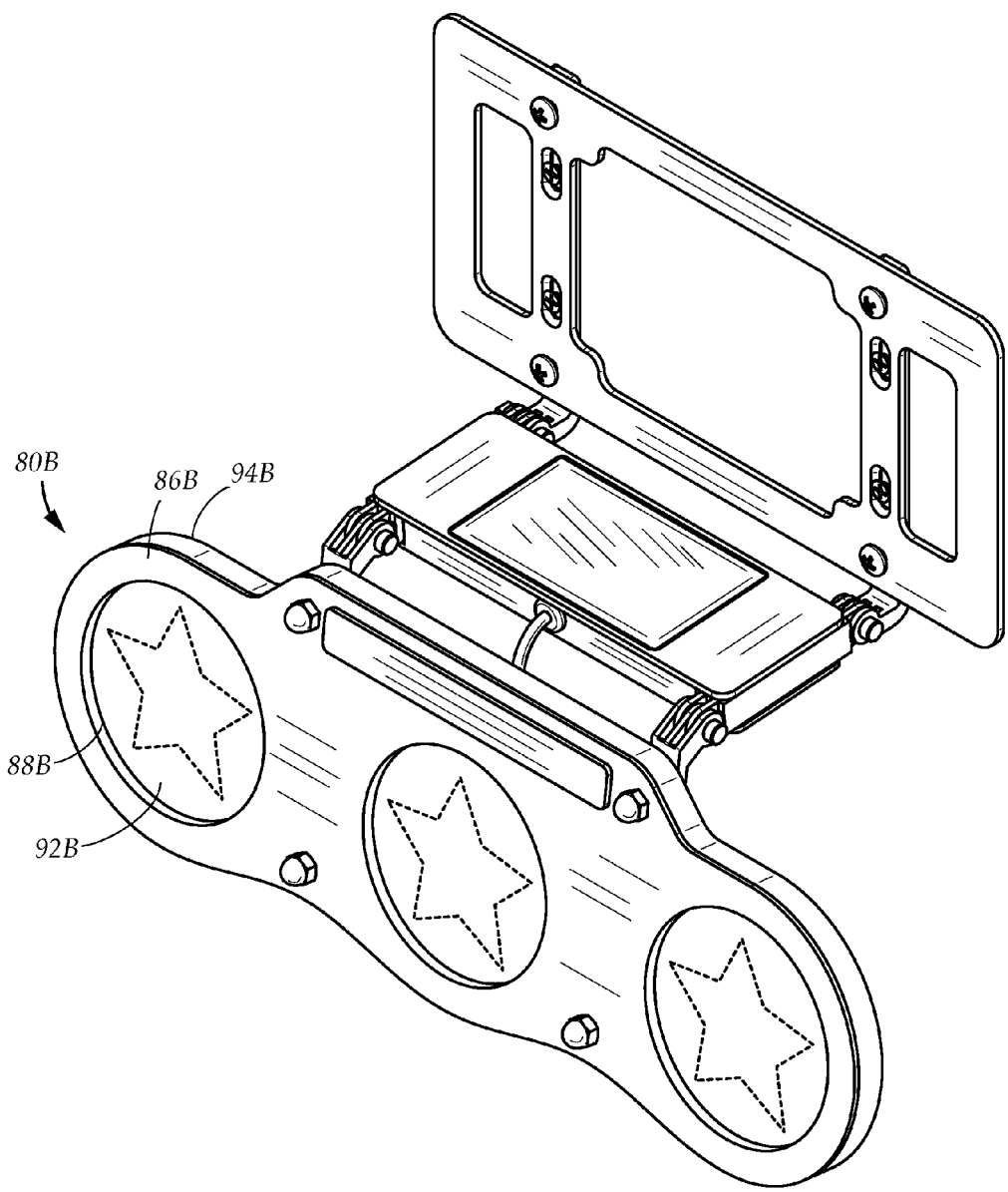
FIG. 2 is a diagrammatic perspective view of the multi-position illuminated signage panel with a display assembly having a plurality of display windows, in accordance with an embodiment of the present disclosure.

Turning to FIG. 2, a further embodiment of the display assembly 80B is depicted, where the display frame 86B has a plurality of display windows 88B, through which a plurality of sign inserts 92B can be seen.

Figure 3:
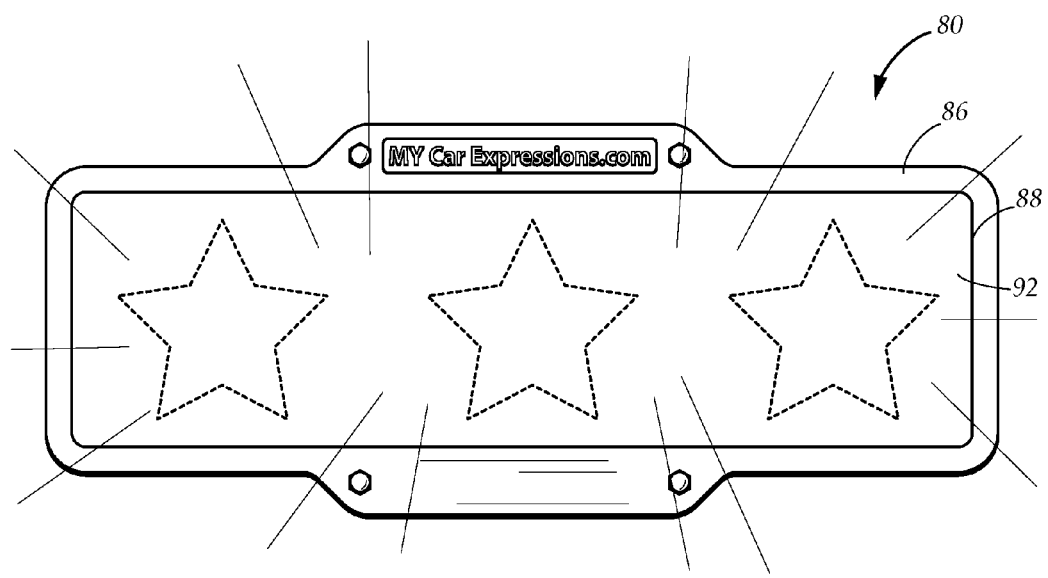
FIG. 3 is a diagrammatic front view of an exemplary display assembly of the multi-position illuminated signage panel, wherein the display assembly contains an illumination panel for illuminating a sign insert within a display window.

FIG. 3 depicts the display assembly 80 in a diagrammatic front view. The display assembly 80 may further comprise an illumination panel disposed between the sign insert 92 and the backing plate, so that light from the illumination panel passes through the sign insert 92 and creates a back-lighting effect. The sign insert 92 can be made of a translucent material such as a plastic sheet in order to enhance the back-lighting effect by allowing light to pass through the sign insert 92. The illumination panel can be configured to illuminate the sign insert 92 based on whether the vehicle is in motion, as well as the amount of ambient lighting to which the multi-position illuminated signage panel is exposed.

Figure 4:
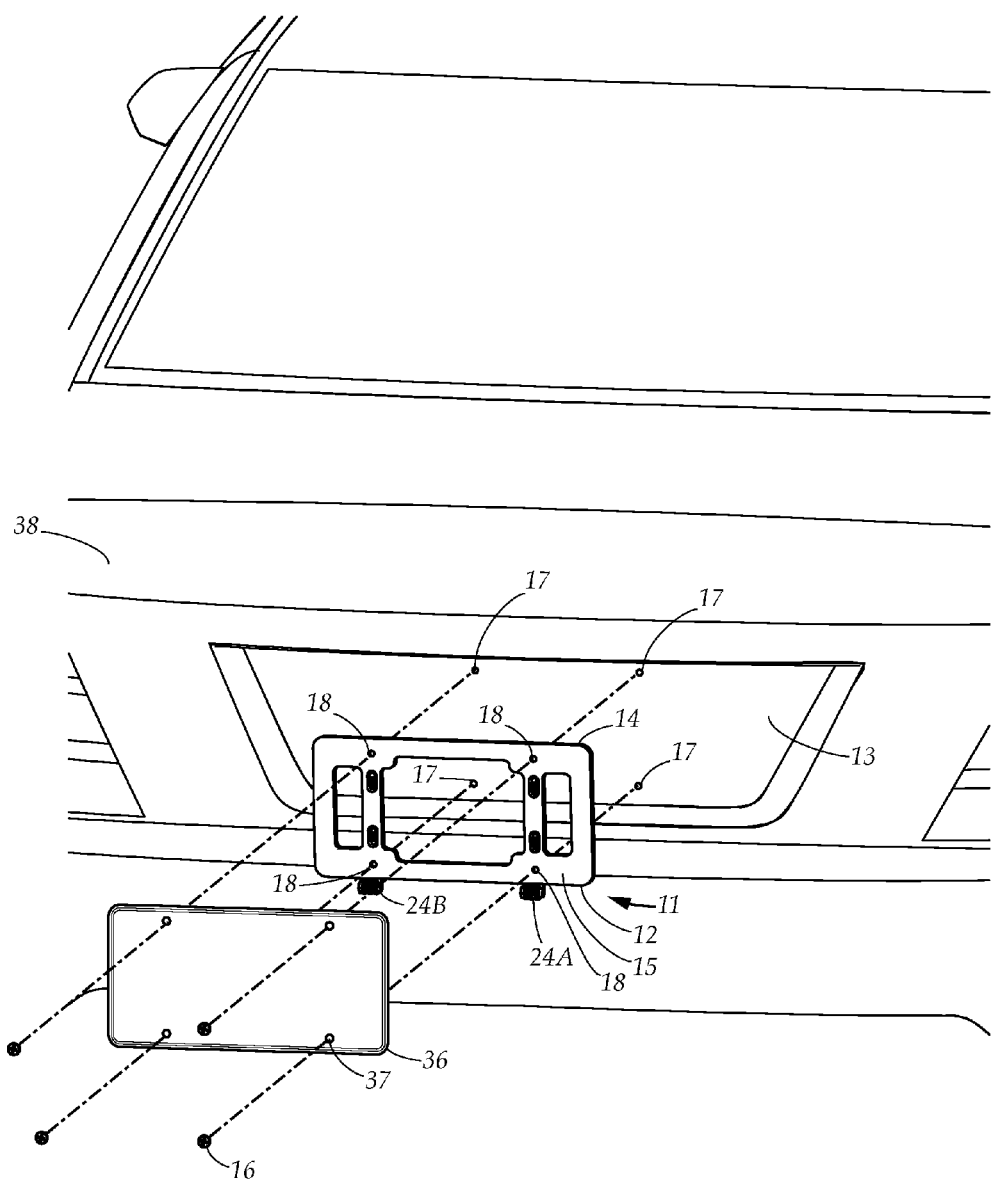
FIG. 4 is a diagrammatic perspective view showing a mounting assembly in accordance with an embodiment of the present disclosure, comprising a license plate frame attached to a pair of mounting brackets, along with a plurality of anchoring pins for anchoring a license plate to the mounting assembly.

FIG. 4 depicts the mounting assembly 11 in an exploded view showing the configuration of the license plate 36 and mounting assembly 11 in relation to the vehicle 38 and the vehicle mounting surface 13. The vehicle mounting surface 13 is configured with a plurality of vehicle mounting surface holes 17. Since the vehicle mounting surface 13 can correspond to a position at the rear of the vehicle where the license plate would typically be mounted, such as on the trunk or bumper, the existing license plate mounting holes may serve as the vehicle mounting surface holes 17. As such, there is no need to damage the vehicle by using adhesives or drilling new holes in order to mount the multi-position illuminated signage panel.

The license plate 36 comprises a plurality of license plate anchoring holes 37. Similarly, the license plate frame 12 has a plurality of license plate frame anchoring holes 18 formed on the license plate frame outer face 15 which extend through to the license plate frame inner face 14. The license plate 36 is positioned against the license plate frame outer face 15 such that the license plate anchoring holes 37 align with the license plate frame anchoring holes 18 and a plurality of mounting bracket anchoring slots configured on the right and left mounting brackets 24A, 24B. This alignment allows the anchoring pins 16 to pass through the license plate 36, the license plate frame 12, and the right and left mounting brackets 24A, 24B to fit within the vehicle mounting surface anchoring holes 17 on the vehicle mounting surface 13. The plurality of anchoring pins 16 therefore allow the mounting assembly to be firmly anchored against the vehicle mounting surface 13. The anchoring pins 16 may be screws, bolts, or other similar fasteners commonly used in the field of automotive technology. The mounting assembly 11 may optionally be anchored to the vehicle mounting surface 13 without the license plate 36.

Figure 5A:
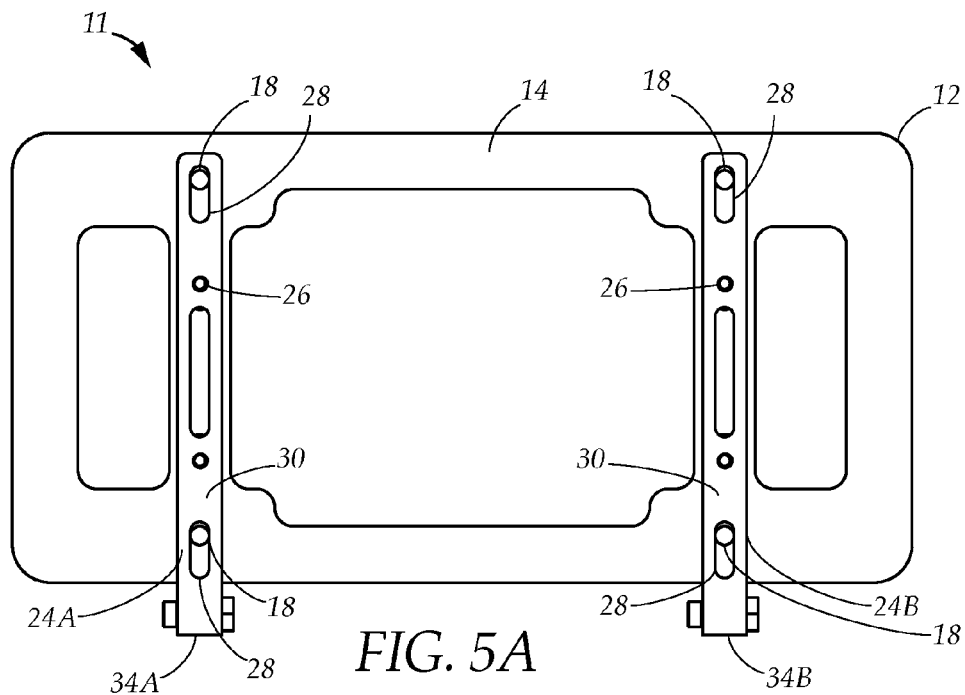
FIGS. 5A-5B are diagrammatic rear views depicting a mounting assembly in accordance with the present disclosure, where the position of the right and left mounting brackets can be raised or lowered in relation to the license plate frame by adjusting the position of the anchoring pins within a plurality of anchoring slots disposed on each mounting bracket.
Figure 5B:
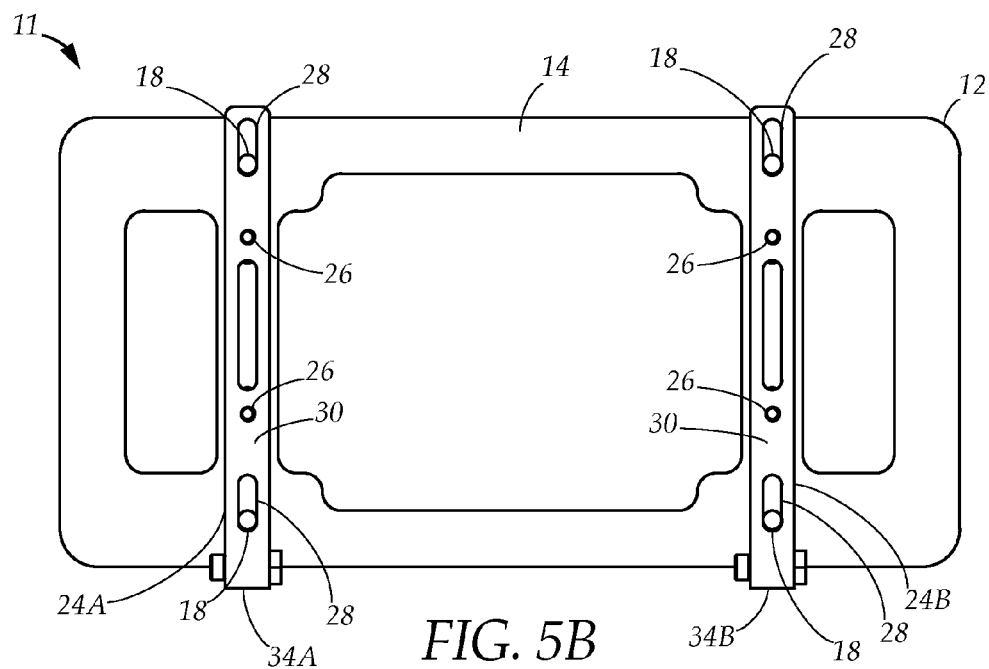

FIGS. 5A-B depict the mounting assembly from a rear view. The right and left mounting brackets each further comprise a mounting bracket front face oriented towards the license plate frame 12, and a mounting bracket rear face 30 oriented away from the license plate frame 12 and towards the vehicle. Referring to FIGS. 1 and 5A-B simultaneously, the license plate frame anchoring holes 18 disposed on the license plate frame 12 are aligned with the mounting bracket anchoring slots 28, while the mounting bracket retaining holes 26 are aligned with the license plate retaining slots 22. The license plate retaining slots 22 and the mounting bracket anchoring slots 28 may be configured as vertically oriented oblong apertures. Anchoring pins 16 held within the license plate anchoring holes 18 may slide vertically within the mounting bracket anchoring slots 28, while the license plate frame retaining slots 22 allow the license plate retaining pins 20 held within the mounting bracket retaining holes 26 to slide vertically within the license plate frame retaining slots 22. This allows the position of the right and left mounting brackets 24A, 24B to be adjusted vertically in relation to the license plate frame 12. FIG. 5A depicts the right and left mounting brackets 24A, 24B disposed in a lowered position in relation to the license plate frame 12, while FIG. 5B depicts the right and left mounting brackets 24A, 24B disposed in an upward position. Referring to FIGS. 1, 4, and 5A-B simultaneously, the anchoring pins 16 and the license plate frame retaining pins 20 may be tightened in order to lock the license plate frame in position relative to the right and left mounting brackets 24A, 24B, as well as anchor the mounting assembly 11 to the vehicle mounting surface 13.

Figure 6A:
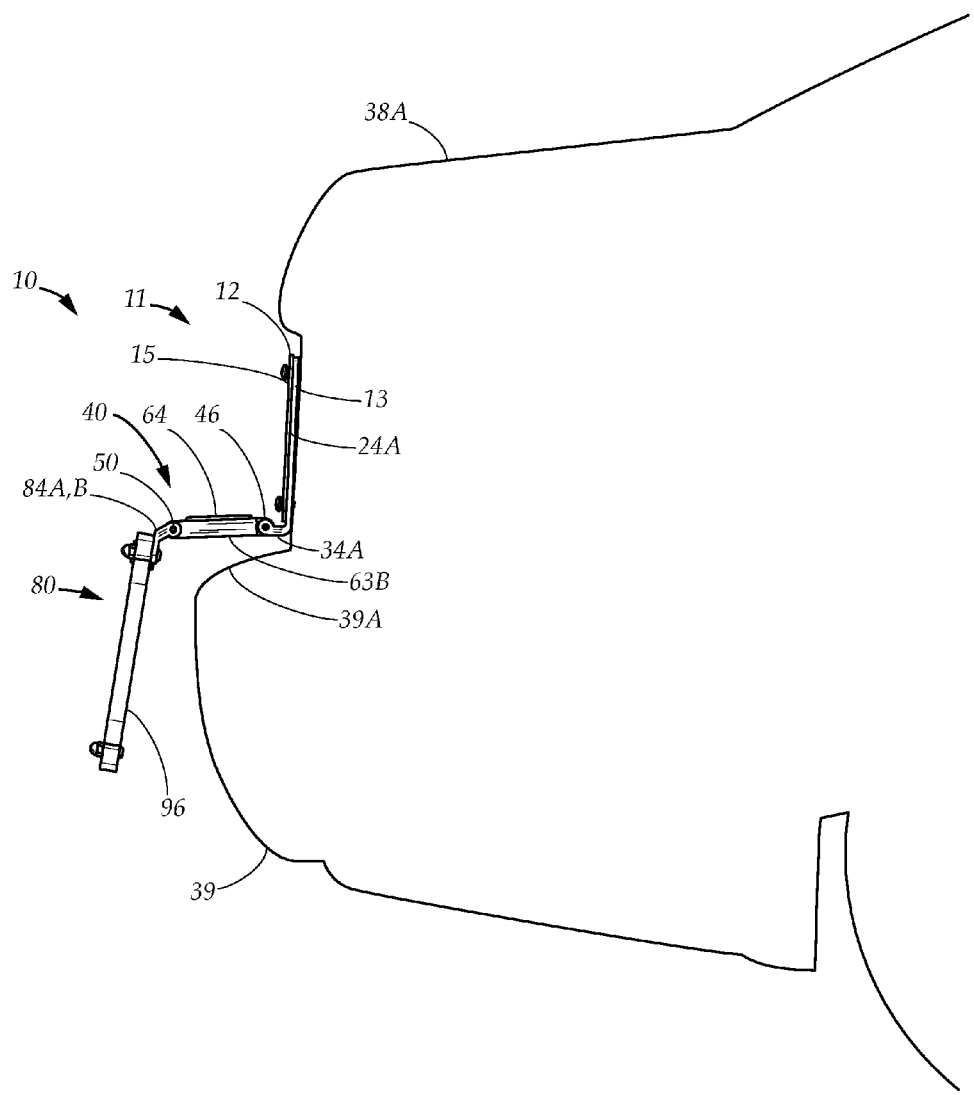
FIGS. 6A-6C form a series of diagrammatic side views depicting the multi-position illuminated signage panel attached to various vehicles and arranged in multiple display positions, in accordance with an embodiment of the present disclosure.
Figure 6B:
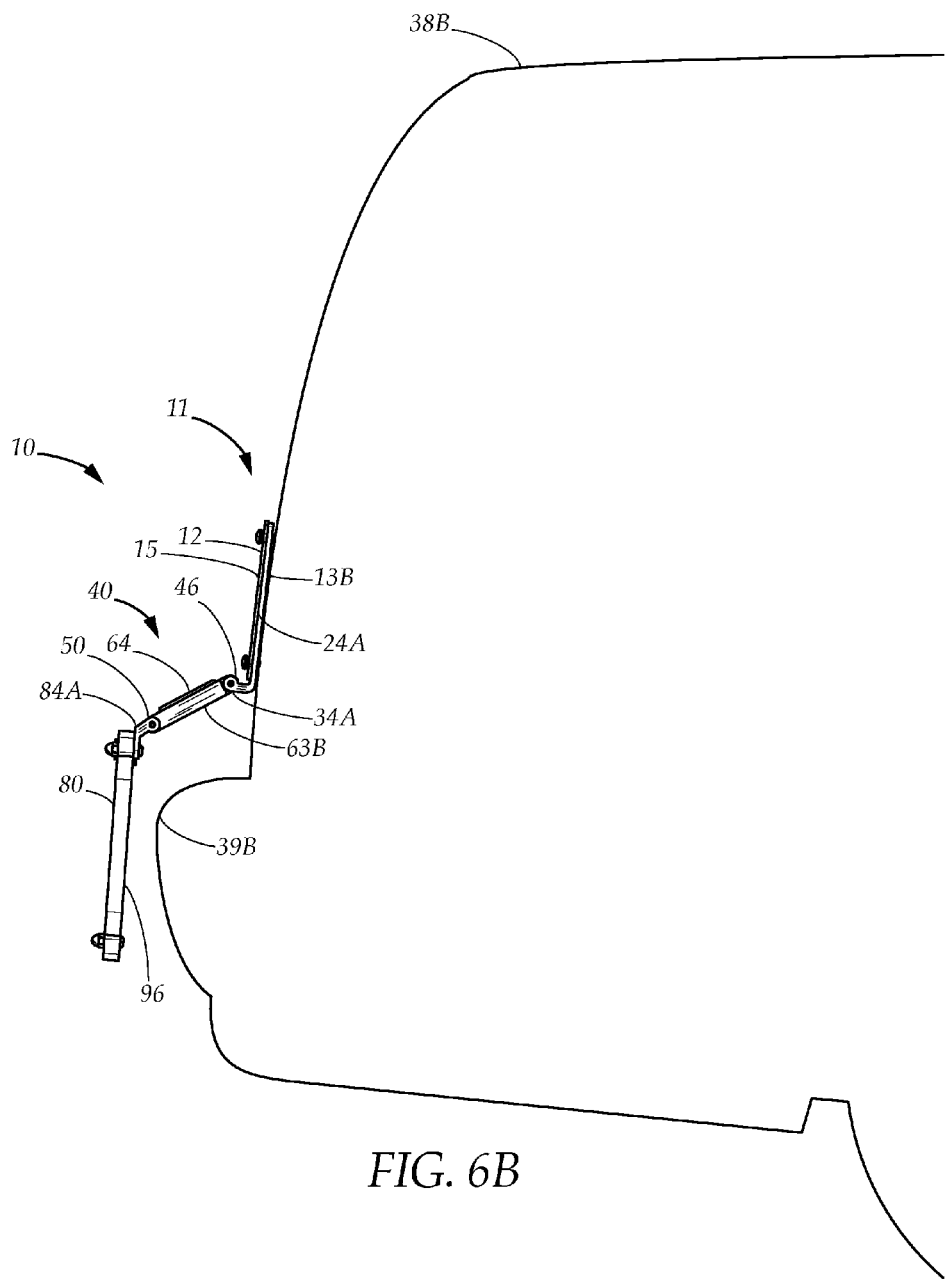
Figure 6C:
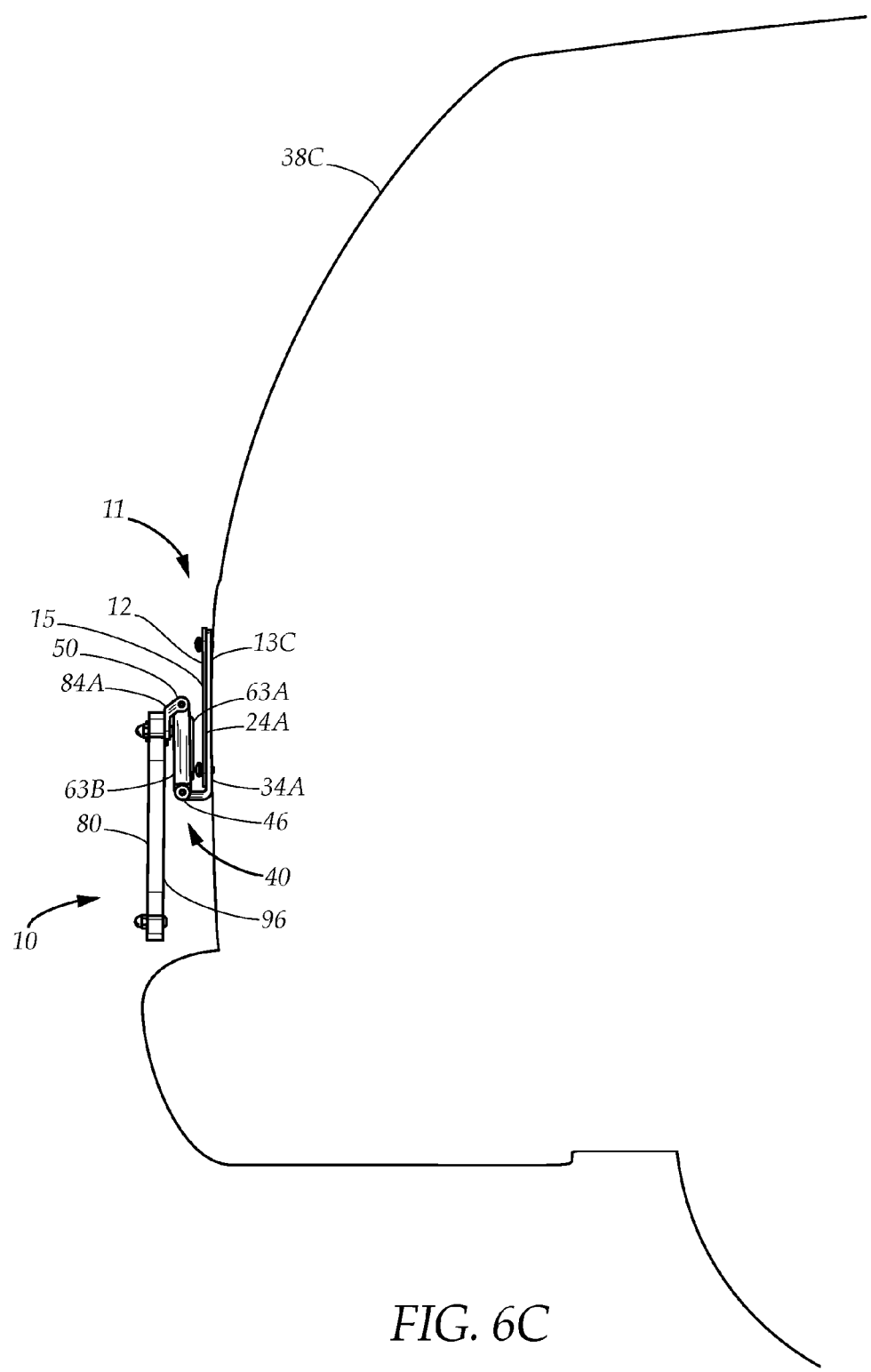

FIGS. 6A-C depict the multi-position illuminated signage panel 10 from a side view while anchored to vehicles 38A-C. The intermediate assembly 40 and the display assembly 80 can be adjusted so the display assembly 80 can be placed in multiple display positions while allowing the solar panel 64 to be oriented upwards to receive sunlight. FIG. 6A depicts the multi-position illuminated signage panel 10 anchored via the mounting assembly 11 to the vehicle mounting surface 13 disposed on the vehicle 38A, which further has a bumper 39 positioned below the vehicle mounting surface 13, where the bumper 39 has an upper bumper surface 39A. The intermediate assembly 40 is positioned, by adjusting the upper hinges 46, at an angle approximately 90-degrees in relation to the license plate frame outer face 15 of the license plate frame 12. The display assembly 80 is positioned, by adjusting the lower hinges 50, at an angle approximately 90-degrees in relation to the control unit housing lower face 63B. The multi-position illuminated signage panel may be further positioned so that the control unit lower face 63B of the intermediate assembly 40 rests against the upper bumper surface 39A while the backing plate rear face 96 rests against the bumper 39. By resting the intermediate assembly 40 and the display assembly against the bumper 39, the bumper can provide a degree of support when the multi-position illuminated signage panel 10 is subjected to the up and down jostling motion of the vehicle. FIG. 6B depicts the multi-position illuminated signage panel 10 in an alternate configuration, where the mounting assembly 11 is anchored to the vehicle mounting surface 13B of a larger vehicle 38B where there is a gap between the vehicle mounting surface and the bumper 39B. The upper hinges 46 further allow the intermediate assembly 40 to be positioned at an angle greater than 90-degrees in relation to the license plate outer face 15 of the license plate frame 12. Likewise, the lower hinges 50 allow the display assembly to be positioned at an angle greater than 90-degrees relative to the control unit housing lower face 63B. By positioning both the intermediate assembly 40 and the display assembly 80 at angles of approximately 135-degrees relative to the license plate frame 12 and the control unit housing lower face 63B respectively, the display assembly 80 can be adjusted so that the backing plate rear face 96 rests against the bumper 39B. In the absence of the bumper 39B, the multi-position illuminated signage panel can be arranged in a fully extended position. The upper hinges 46 allow the intermediate assembly 40 to be fully lowered to a position 180-degrees in relation to the license plate frame outer face 15, while the lower hinges 50 allow the display assembly 80 to be lowered to a position 180-degrees in relation to the control unit housing lower face 63B. Turning to FIG. 6C, the multi-position illuminated signage panel 10 can further be arranged in a folded position. The intermediate assembly 40 can be raised towards the license plate frame 12 using the upper hinges 46 so that the control unit housing upper face 63A is both facing and parallel to the license plate frame outer face 15. The display assembly 80 can be adjusted in the direction of the intermediate assembly 40 using the lower hinges 50 so that the backing plate rear face 96 is both facing and parallel to the control unit housing lower face 63B. Referring to FIGS. 1 and 6C simultaneously, the sign insert 92 remains in view when the multi-position illuminated signage panel 10 is in the folded position. The intermediate assembly 40 and display assembly 80 can be freely positioned at any position allowed by the upper hinges 46 and lower hinges 50 respectively. In other embodiments contemplated in the present disclosure, the upper and lower hinges 46, 50 can be configured to allow for a range of motion of less than 180-degrees. The upper and lower hinges 46, 50 may also be configured to allow for a range of motion of up to 270-degrees.

Referring to FIGS. 1, 5A-B, and FIG. 6C, the intermediate assembly 40 and display assembly 80 may obscure the license plate frame outer face 15 from view. To compensate, in some embodiments the mounting bracket anchoring slots 28 and license plate frame retaining slots 22 may be configured as vertically oriented oblong apertures of sufficient length to allow the right and left mounting brackets 24A, 24B to be lowered in relation to the license plate frame 12 so that the license plate frame 12 is no longer obscured from view by the intermediate assembly 40 and display assembly 80.

Figure 7:
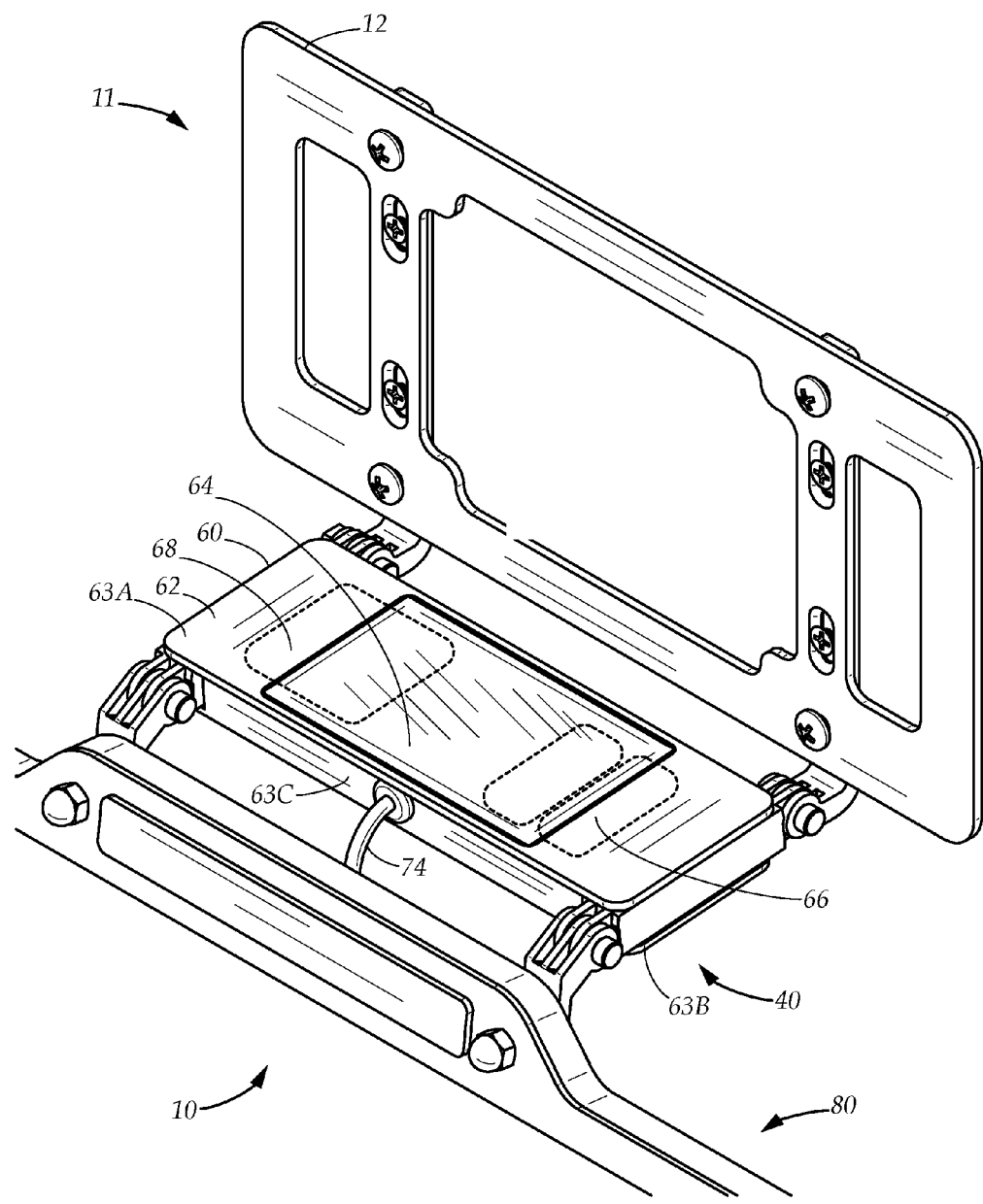
FIG. 7 is a diagrammatic perspective view depicting the intermediate assembly, along with a control unit comprising a solar panel and a battery for powering the illumination panel within the display assembly, in accordance with an embodiment of the present disclosure.
Figure 7A:
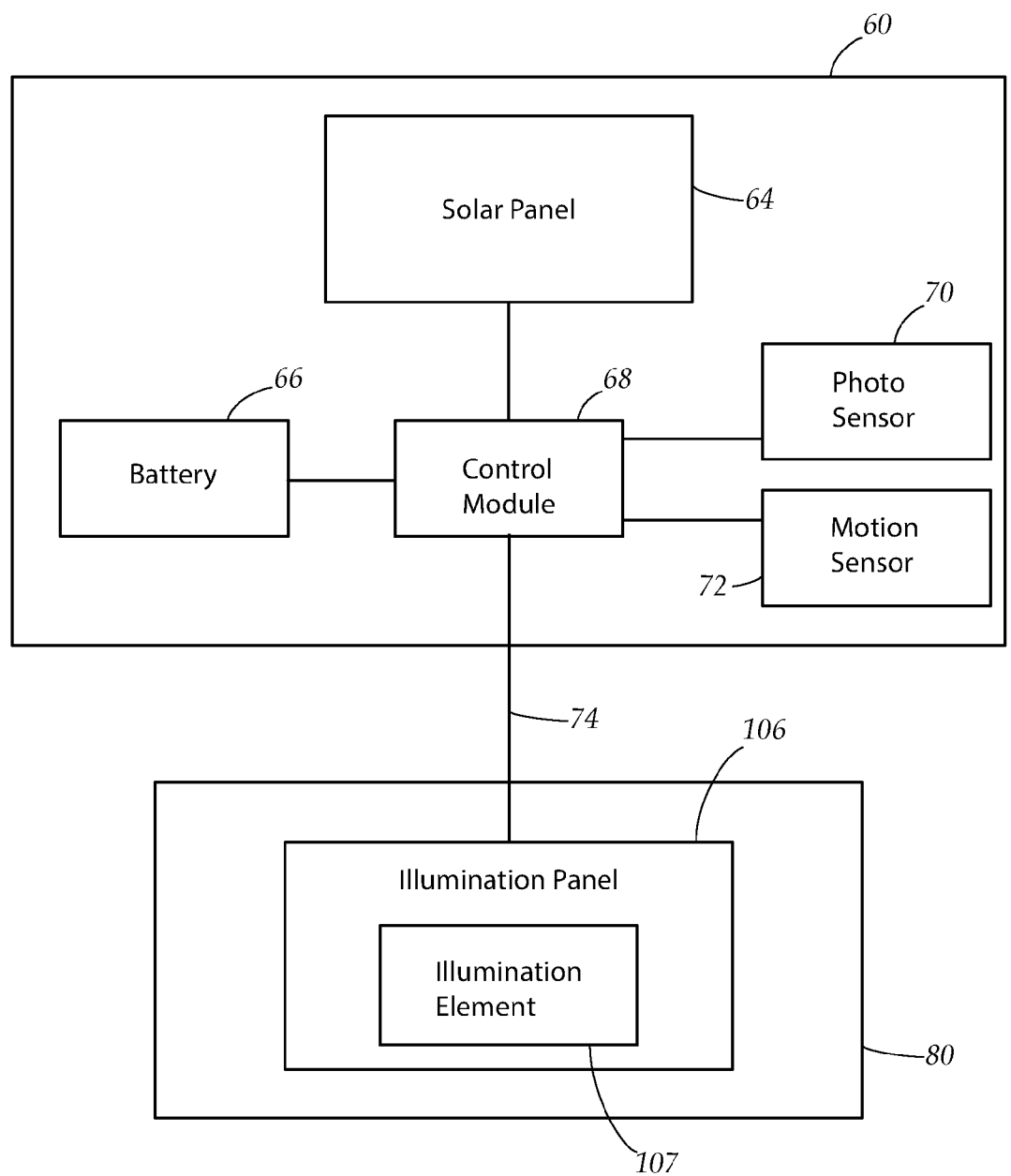
FIG. 7A is a block diagram depicting an example control unit operably connected to the solar panel, battery, and illumination panel, in accordance with an embodiment of the present disclosure.

Turning to FIG. 7, the intermediate assembly 40 contains the control unit 60 which controls the operation of the illumination panel within the display assembly 80. The control unit housing 62 houses and protects the components of the control unit. The control unit housing upper face 63A, the control unit housing lower face 63B, and control unit housing frame 63C may fit together in such a way that the control unit housing 62 is weatherproof, such as through the use of rubber or silicone seals to prevent moisture from seeping into the control unit housing 62. The control module 68 and battery 66 are contained within the control unit housing 62, while the solar panel 64 may be disposed on the control unit housing upper face 63A. The solar panel 64 produces electric current when exposed to sunlight, allowing the control unit 60 to charge the battery 66. The battery 66 can be implemented using any rechargeable battery technology employed in consumer electronics, such as a lithium-ion battery. FIG. 7A depicts a block diagram showing an example control unit 60. The control module 68 comprises a processor and a memory, and may be implemented using a simple microcontroller. Referring to FIGS. 7-7A, the control module 68 is connected to the solar panel 64 and the battery 66, and may be configured to act as a charging circuit which regulates the flow of electrical current generated by the solar panel 64 to the battery 66. The control unit 60 may be configured with additional batteries 66, such as three batteries 66. The control module is further connected to the illumination panel 106 via the power connector 74, which connects the control unit 60 to the display assembly 80. The control unit housing 62 may further contain the motion sensor 72 and the photosensor 70, which are operably connected to the control module 68. The photosensor 70 can be positioned on the control unit housing upper face 63A. The motion sensor 72 is configured to detect motion, and can be implemented using a sensor such as an accelerometer to determine when the vehicle accelerates and decelerates. The motion sensor 72 makes it unnecessary to equip the multi-position illuminated signage panel with an on/off switch, as the illumination panel 106 can be automatically activated when the vehicle is in motion, and deactivated when the vehicle ceases its motion. By configuring the control module 68 to further act as a clock or timer, the control module 68 can be further configured to deactivate the illumination panel 106 after a delay time interval. The delay time interval can be measured in seconds, minutes, or hours, such as an interval of six minutes. The photosensor 70 detects the presence of ambient light, allowing the control module 68 to activate the illumination panel 106 in the absence of sunlight, thus conserving power during the day. In some alternate embodiments, the solar panel 64 can be configured to act as a photosensor, such as by configuring the control module 68 to interpret the absence of current generated by the solar panel 64 as the absence of ambient light, or by configuring the control module to calculate intensity of the ambient light by the amount of current generated.

Figure 8:
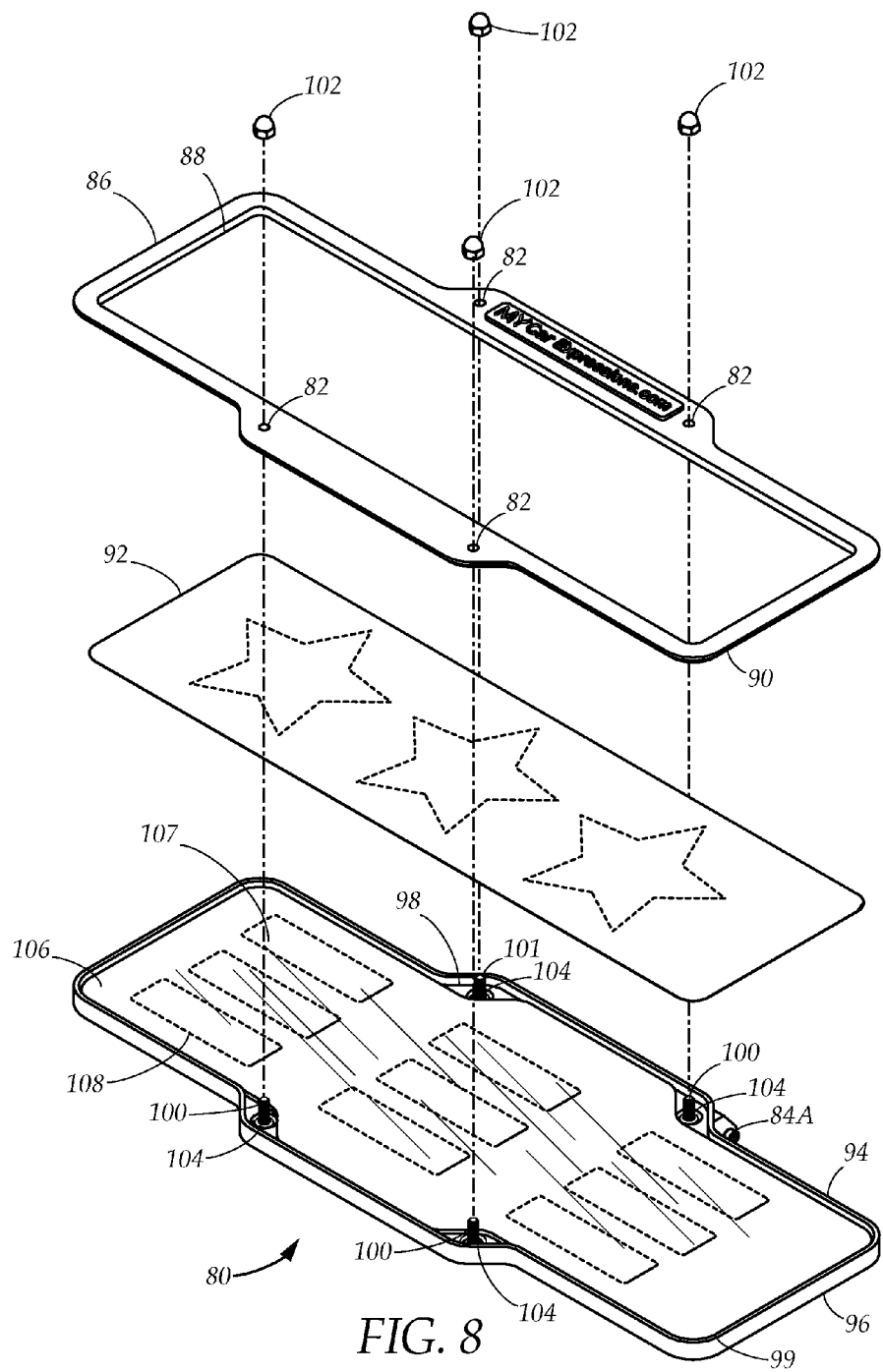
FIG. 8 is an exploded view depicting a display assembly having a display frame, a sign insert, and a backing plate, in accordance with an embodiment of the present disclosure.

Referring to FIG. 8, the display frame 86 and backing plate 94 can be configured in substantially rectangular form, where the display frame 86 and backing plate 94 combine to form the display assembly 80. The display frame 86 and backing plate 94 can be configured in other shapes, where the display frame 86 is configured to match the shape of the backing plate 94. The backing plate further comprises a backing plate front face 98 opposite to the backing plate rear face and which is oriented towards the display frame 86, and a backing plate outer edge 99 forming a wall extending from the perimeter of the backing plate front face 98 towards the display frame 86. The display frame 86 further comprises a display frame inner face corresponding to the surface of the display frame oriented towards the backing plate 94. The illumination panel 106 is placed on top of the backing plate front face 98, while the sign insert 92 is placed on top of the illumination panel 106. The display frame 86 is then placed over the sign insert 92 and is secured to the backing plate 94. The display frame 86 and backing plate 94 can be held together by a plurality of display assembly retaining pins 100, which may also serve to secure the right display connecting arm 84A and the left display connecting arm against the backing plate rear face 96. The display assembly retaining pins 100 may be bolts, screws, or other fasteners. The display assembly retaining pins 100 pass through a plurality of connecting arm retaining holes disposed in the right and left display connecting arms, through a plurality of backing plate retaining holes 104 configured in the backing plate 94 which align with the connecting arm retaining holes, and a plurality of display frame retaining holes 82 configured in the display frame 86 which align with the backing plate retaining holes 104. The display assembly retaining pins 100 may be secured with a plurality of display assembly retaining pin caps 102. Once the display assembly retaining pins 100 are securely tightened, the display frame 86 is held in place against the backing plate 94, with the display frame inner face in contact with the backing plate outer edge 99. The backing plate outer edge 99 may further comprise a layer of rubber, silicone, or other similar material in order to prevent moisture from seeping through the point of contact between the backing plate outer edge 99 and the display frame inner face. The display assembly 80 may be further configured so that the display frame 86 can be detached from the backing plate 94, further allowing the sign insert 92 to be removed, as well as be replaced with a different sign insert.

The display window 88 formed within the display frame 86 may be a rectangular opening smaller than the area of the display frame 86. The sign insert 92 may be a rectangular sheet or plate slightly larger than the area of the display window 88, and is installed within the display assembly 80 by placing the sign insert 92 between the display frame 86 and the backing plate 94, and then securing the display assembly to the backing plate 94 such that the sign insert 92 is securely held in place. To enhance the back-lighting effect produced by light from the illumination panel 106 shining through sign insert 92, the sign insert 92 may be partially or completely translucent, and can be formed out of translucent material such as plastic or glass. The sign insert 92 can be made partially translucent by painting or masking portions of the sign insert with paint or other opaque material.

The display frame inner face may comprise a sign insert retaining edge 90 which forms a lip with a perimeter slightly larger than the perimeter of the display window 88, which helps to grip the sign insert 92. The sign insert retaining edge may be formed from rubber or silicone to prevent moisture from seeping into the display assembly 80 between the display window 88 and the sign insert 92.

The illumination panel 106 is disposed on the backing plate front face 98, and comprises an illumination element 107 for producing light. The illumination panel 106 can be configured as a plate in a shape substantially matching the shape of the backing plate front face 98 so that the illumination panel 106 is securely retained against the backing plate outer edge 99. The illumination panel 106 may be configured in other sizes and shapes, and can be fastened to the backing plate front face 98 through other attachment means such as adhesives, screws, clips, or other fastening means. The illumination element 107 can formed from light-emitting diodes (LEDs) arranged as a panel, strip, cluster, or other arrangement. Other lighting technologies with low power consumption can be employed in place of LEDs, as will be apparent to a person of ordinary skill in the art in the field of the invention. The illumination panel 106 can further incorporate a combination of one or more illumination elements 107 to illuminate the sign insert 92. Each illumination element 107 can illuminate a portion of the sign insert 92, or the entire sign insert. A plurality of illumination elements 107 may also be employed to collectively illuminate the sign insert 92. In one embodiment, the illumination panel 106 further comprises one or more depressions 108 configured to receive an illumination element 107. Each depression 108 may have sufficient depth so that the illumination element 107 contained within the depression 108 does not protrude past the surface of the illumination panel 106. Referring to FIGS. 7A and 8 simultaneously, the backing plate 94 is further configured to connect the illumination panel 106 to the power connector 74, such as through wiring, printed circuits, or other form of electrical connection, allowing electrical current to flow from the power connector 74 to the illumination panel 106.

Figure 9:
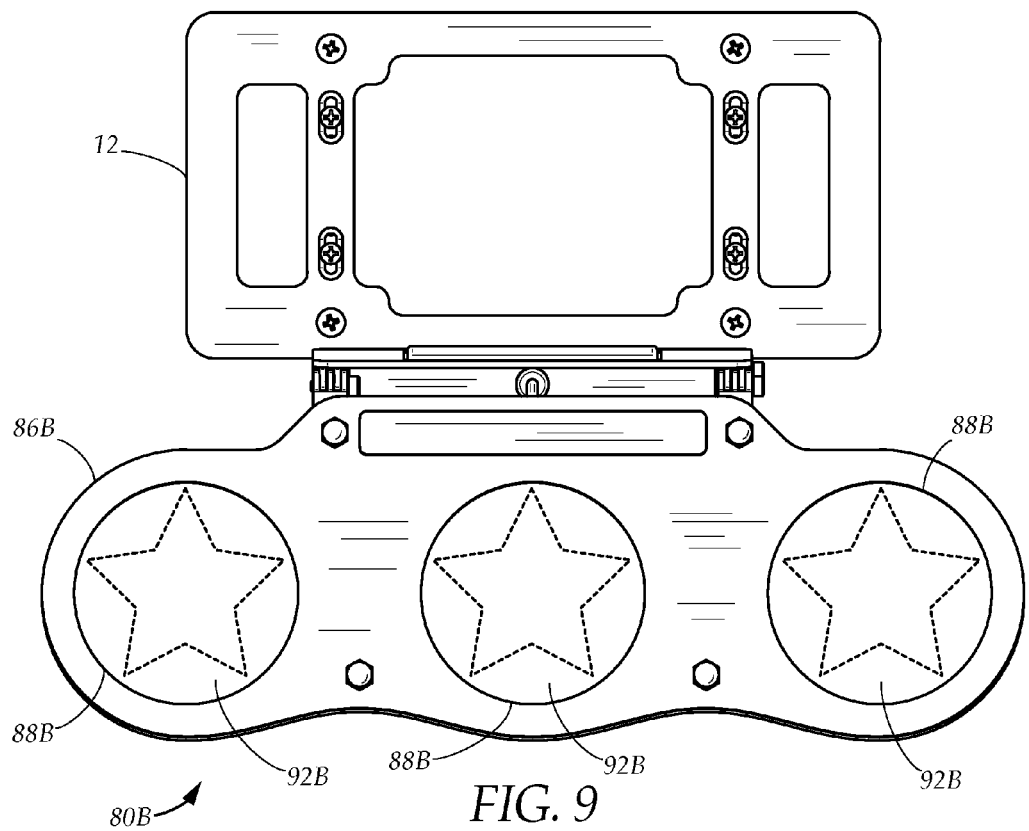
FIGS. 9-9A depict an example sign insert for use with an embodiment of a display assembly with a display frame having a plurality of display windows.
Figure 9A:
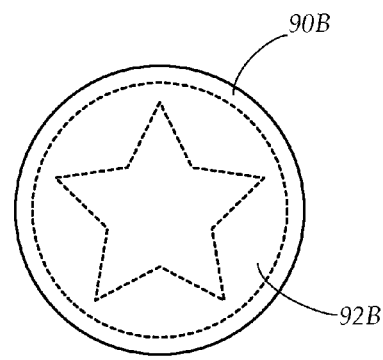

Turning to FIGS. 9-9A, the display assembly 80B may be configured in an alternate arrangement where the display frame 86B comprises a plurality of display windows 88B. The sign insert 92B may be configured in a shape which is slightly larger than the area of one of the plurality of display windows 88B, with one sign insert 92B positioned underneath each of the plurality of display windows 88B. Alternatively, the display windows 88B may be configured to reveal different portions of one sign insert 92B. Referring to FIGS. 8 and 9-9A simultaneously, the display frame 86B may have more than one retaining edge 90 disposed on the display frame inner face and positioned around each display window 88B, which serve to grip a retained area 90B of the sign insert 92B.

Figure 10:
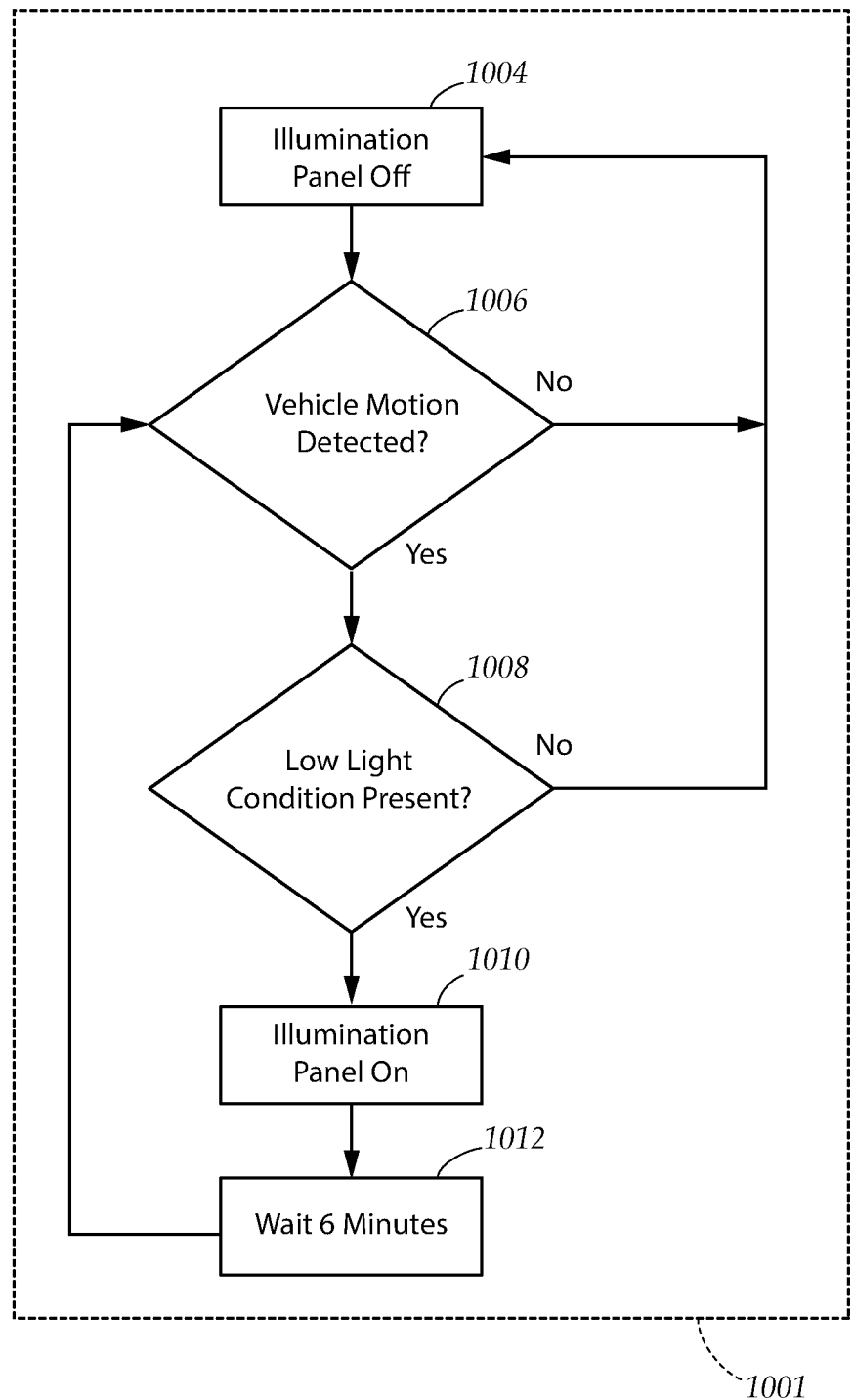
FIG. 10 is a diagram depicting an exemplary process flow by which the control unit controls the illumination of the sign insert within the display window, based on the motion of the vehicle and the presence of light, in accordance with an embodiment of the present disclosure.

FIG. 10 depicts the process flow 1001 controlling the operation of the illumination panel. Referring to FIGS. 7A and 10 simultaneously, the illumination panel 106 begins in a deactivated state 1004 where the illumination panel 106 is turned off. The control module 68 continually monitors the motion of the vehicle at step 1006. If no motion is detected, the process returns to step 1004 and the illumination panel 106 remains in the deactivated state. If the vehicle moves, the motion sensor 72 detects the motion of the vehicle and signals the control module 68 that the vehicle is in motion. The control module 68 then determines if there is low ambient light at step 1008 by reading data from the photosensor 70. If the photosensor 70 is exposed to ambient light, the photosensor sends a signal to the control module 68 indicating that light is present. The photosensor 70 may be configured to signal the control module if the photosensor is exposed to light exceeding a lighting threshold measured in lux or other measure of illuminance. A low lighting threshold would cause the photosensor 70 to become more sensitive and signal the control module 68 when exposed to dim light, causing the illumination panel 106 to activate only in darkness. A high lighting threshold would have the opposite effect. If the control module 68 receives a signal from the photosensor 70, the process returns to step 1004 and the illumination panel 106 remains in the deactivated state. If the control module 68 does not detect the signal from the photosensor 70, the process proceeds to step 1010 and the illumination panel 106 is set to an activated state and turns on. The process then proceeds to step 1012 and the control module 68 sets a deactivation delay equal to a delay time interval, such as six minutes. Once the delay time interval has transpired, the process returns to step 1006 and the control module 68 determines whether the vehicle is in motion via the motion sensor 72. If the motion sensor 72 signals the control module 68 that the vehicle is in motion, the process continues with step 1008. If the motion sensor does not detect the signal from the motion sensor 72, the process returns to step 1004 and the illumination panel is set to the deactivated state and is turned off. Please note that this example is non-limiting, and may be varied in part or in whole while adhering to the principles of the present disclosure. For example, the illumination panel 106 may be deactivated without the delay time interval. The illumination panel 106 may also be activated and deactivated solely based on the motion of the vehicle.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a multi-position illuminated signage panel. The disclosure is illustrated by example in the drawing figures, and throughout the written description. It should be understood that numerous variations are possible, while adhering to the inventive concept. Such variations are contemplated as being a part of the present disclosure.

What is claimed is:

1. A multi-position signage panel, comprising:
   a mounting assembly comprising a right mounting bracket, a left mounting bracket, and a license plate frame configured to receive a license plate, wherein the right and left mounting brackets are attached to a vehicle mounting surface disposed on a vehicle, wherein the license plate frame is attached to the right and left mounting brackets, wherein the mounting assembly is anchored to the vehicle mounting surface by a plurality of anchoring pins, wherein each anchoring pin passes through the license plate and either the right mounting bracket or the left mounting bracket;
   a display assembly comprising a display frame and a backing plate, wherein the display frame comprises a display window, and the backing plate comprises a backing plate front face and a backing plate rear face, wherein the display assembly further comprises a sign insert configured to display a visual element, and an illumination panel disposed on the backing plate front face, wherein the illumination panel comprises an illumination element, and wherein the display frame is secured to the backing plate such that the sign insert is retained between the display frame and the backing plate;
   an intermediate assembly comprising a control unit, a right intermediate connecting arm, and a left intermediate connecting arm, wherein the control unit is retained between the right and left intermediate connection arms and comprises a control unit housing containing a rechargeable battery, a solar panel configured to charge the battery, a photosensor configured to detect the presence of light, a motion sensor configured to detect the motion of the vehicle, and a control module having a processor and a memory,
   a pair of upper hinges configured to connect the mounting assembly to the intermediate assembly, wherein the pair of upper hinges comprise a right upper hinge and a left upper hinge, wherein the right upper hinge connects the right mounting bracket to the right intermediate connecting arm, and the left upper hinge connects the left mounting bracket to the left intermediate connecting arm;
   a pair of lower hinges configured to connect the intermediate assembly to the display assembly, wherein the pair of lower hinges comprise a right lower hinge and a left lower hinge, wherein the right lower hinge connects the right intermediate connecting arm to the backing plate rear face, and the left lower hinge connects the left intermediate connecting arm to the backing plate rear face;
   wherein the upper hinges and lower hinges allow the intermediate assembly and display assembly to be raised and lowered such that the display assembly can be configured in a plurality of display positions;
   wherein the illumination panel produces a back-light effect by producing light via the illumination element which passes through the sign insert;
   wherein the control unit is configured to provide power from the battery to the illumination panel via a power connector; and
   wherein the control module is configured to activate the illumination panel when the control module receives a signal from the motion sensor indicating the vehicle is in motion, and deactivate the illumination panel upon receiving a signal from the photosensor indicating the presence of light exceeding a lighting threshold.

2. The multi-position signage panel of claim 1, wherein the control module, upon activating the illumination panel, is further configured to maintain the illumination panel in an activated state until a delay time interval has elapsed.

3. The multi-position signage panel of claim 2, wherein the sign insert is partially or entirely translucent.

4. The multi-position signage panel of claim 3, wherein the control unit housing comprises a control unit housing upper face, a control unit housing lower face, and a control unit housing frame, wherein the solar panel is disposed on the control unit housing upper face.

5. The multi-position signage panel of claim 4, wherein the pair of upper hinges are configured to allow the intermediate assembly to be placed in a folded position where the control unit upper face is facing the license plate frame, and wherein the pair of upper hinges are further configured to allow the intermediate assembly to be raised and lowered with a range of motion of 180 degrees in relation to the plane defined by the license plate frame.

6. The multi-position signage panel of claim 5, wherein the pair of lower hinges are configured to allow the display assembly to be placed in a folded position where the backing plate rear face is facing the control unit housing lower face, and wherein the pair of lower hinges are further configured to allow the display assembly to be raised and lowered with a range of motion of 180 degrees in relation to the plane defined by the control unit housing lower face.

7. The multi-position signage panel of claim 6, wherein the right mounting bracket comprises a right mounting bracket connecting arm and the left mounting bracket comprises a left mounting bracket connecting arm, wherein the right mounting bracket connecting arm and left mounting bracket connecting arm are configured at an angle perpendicular to the license plate frame; and wherein the right mounting bracket connecting arm is connected to the right upper hinge, and the left mounting bracket connecting arm is connected to the left upper hinge.

8. The multi-position signage panel of claim 7, wherein the display assembly further comprises a right display connecting arm and a left display connecting arm disposed on the backing plate rear face, wherein the right and left display connecting arms extend from the backing plate rear face at an angle of approximately 45 degrees in relation to the backing plate rear face, and wherein the right display connecting arm is connected to the right lower hinge, and the left display connecting arm is connected to the left lower hinge.

9. The multi-position signage panel of claim 8, wherein the right and left mounting brackets further comprise a plurality of license plate retaining holes, and the license plate frame further comprises a plurality of vertically oriented license plate retaining slots; and wherein the license plate frame is attached to the right mounting bracket and left mounting bracket via a plurality of license plate frame retaining pins, wherein each license plate retaining pin passes through one of the license plate frame retaining slots and is secured in one of the license plate frame retaining holes on either the right or left mounting brackets.

10. The multi-position signage panel of claim 9,
wherein the right and left mounting brackets further comprise a plurality of vertically oriented mounting bracket anchoring slots which accept the plurality of anchoring pins passing through the license plate frame and the right and left mounting brackets; and
wherein the plurality of anchoring pins are configured to slide vertically within the plurality of mounting bracket anchoring slots, and the plurality of retaining pins are configured to slide vertically within the plurality of license plate frame retaining slots, allowing the right and left mounting brackets to be raised or lowered relative to the license plate frame.

11. The multi-position signage panel of claim 10, wherein the display frame further comprises a display frame inner face oriented towards the backing plate, wherein the display frame inner face comprises a sign insert retaining edge extending from the display frame inner face and forming a perimeter around the display window, and wherein the sign insert retaining edge is configured to grip the sign insert.

12. The multi-position signage panel of claim 11, wherein the display assembly further comprises a plurality of sign inserts, and the display frame further comprises a plurality of display windows, wherein each of the plurality of display windows contains one sign insert.

13. A method for illuminating a multi-position signage panel, comprising the steps of:
providing a multi-position signage panel comprising a mounting assembly anchored to a vehicle mounting surface disposed on a vehicle;
providing an intermediate assembly attached to the mounting assembly via a pair of upper hinges, wherein the intermediate assembly comprises a control unit having a control module with a processor and memory, a rechargeable battery, a solar panel configured to charge the battery when the solar panel is exposed to light, a motion sensor configured to signal the control module when the vehicle is in motion, and a photosensor configured to signal the control module when the photosensor is exposed to light exceeding a lighting threshold;
providing a display assembly attached to the intermediate assembly via a pair of lower hinges, wherein the display assembly comprises a sign insert for displaying a visual element and an illumination panel positioned behind the sign insert, wherein the illumination panel comprises an illumination element, and wherein the control unit provides power to the illumination panel via a power connector;
initiating an illumination process where the illumination panel is in a deactivated state;
detecting the motion of the vehicle, wherein the control module awaits the signal from the motion sensor indicating the vehicle is in motion;
entering an activation step, wherein the control module causes the illumination panel to enter an activated state when the control module determines the vehicle is in motion and the photosensor is not exposed to light exceeding the lighting threshold; wherein the illumination panel produces a back-light effect by generating light via the illumination element which passes through the sign insert; and
entering a deactivation step, wherein the control module causes the illumination panel to enter the deactivated state when the motion sensor indicates the vehicle is not in motion, or when the photosensor is exposed to light exceeding the lighting threshold.

14. The method of claim 13, wherein the step of entering an activation step further comprises:
wherein the control module sets a delay time interval upon causing the illumination panel to enter the activated state, wherein the illumination panel remains in the activated state until the delay time interval has elapsed.

15. The method of claim 14, wherein the step of providing a display assembly further comprises:
wherein the display assembly comprises a sign insert formed from a translucent material.

* * * * *